(12) United States Patent
Ruffini et al.

(10) Patent No.: US 10,492,160 B2
(45) Date of Patent: Nov. 26, 2019

(54) NETWORK NODE

(71) Applicant: Telefonaktiebolaget LM Ericsson (publ), Stockholm (SE)

(72) Inventors: Stefano Ruffini, Pisa (IT); Giulio Bottari, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 3 days.

(21) Appl. No.: 15/561,259

(22) PCT Filed: Apr. 1, 2015

(86) PCT No.: PCT/EP2015/057266
§ 371 (c)(1),
(2) Date: Sep. 25, 2017

(87) PCT Pub. No.: WO2016/155828
PCT Pub. Date: Oct. 6, 2016

(65) Prior Publication Data
US 2018/0124730 A1 May 3, 2018

(51) Int. Cl.
*H04W 56/00* (2009.01)
*H04L 12/863* (2013.01)
(Continued)

(52) U.S. Cl.
CPC ......... *H04W 56/0045* (2013.01); *H04L 47/28* (2013.01); *H04L 47/50* (2013.01);
(Continued)

(58) Field of Classification Search
None
See application file for complete search history.

(56) References Cited

U.S. PATENT DOCUMENTS

2011/0228831 A1* 9/2011 Hirata ............... H04J 3/0682 375/224
2013/0266323 A1* 10/2013 Tan ................... H04J 3/0682 398/115

(Continued)

FOREIGN PATENT DOCUMENTS

| WO | 2011050844 A1 | 5/2011 |
| WO | 2013189553 A1 | 12/2013 |

OTHER PUBLICATIONS

Tenner, Michael D., "IEEE 802 Time-Sensitive Networking: Extending Beyond AVB", Sep. 30, 2013, 1-30.
(Continued)

*Primary Examiner* — Christine T Duong
(74) *Attorney, Agent, or Firm* — Sage Patent Group

(57) ABSTRACT

A network node (15) is configured to switch data packets between a Remote Radio Unit (2) and a Digital Unit (4). The network node comprises one or more input port (33) configured to receive said data packets (52*a*) and receive further packets having a destination other than one of a Remote Radio Unit and a Digital Unit. One or more output port (35) is configured to transmit said data packets and said further packets. A scheduler (31) is configured to control transmission from the output port according to a scheduling cycle (41*a*). The scheduler is configured to schedule only said data packets to be transmitted in a first period of the scheduling cycle, and schedule one or more of said further packets to be transmitted in a separate second period of the scheduling cycle.

12 Claims, 7 Drawing Sheets

(51) Int. Cl.
*H04L 12/841* (2013.01)
*H04L 12/869* (2013.01)
*H04W 72/12* (2009.01)
*H04L 12/823* (2013.01)
*H04L 12/875* (2013.01)

(52) U.S. Cl.
CPC ......... *H04L 47/60* (2013.01); *H04W 72/1242* (2013.01); *H04L 47/283* (2013.01); *H04L 47/32* (2013.01); *H04L 47/56* (2013.01)

(56) References Cited

U.S. PATENT DOCUMENTS

2015/0133111 A1* 5/2015 Bevan .................. H04B 1/1027
455/423
2016/0205589 A1* 7/2016 Lorenz .................. H04L 12/413
370/458

OTHER PUBLICATIONS

Unknown, Author, "Bridges and Bridged Networks—Amendment: Enhancements for Scheduled Traffic", IEEE P802.1 Qbv/D1.1, Draft Standard for Local and Metropolitan Area Networks, Mar. 7, 2014, 1-26.

* cited by examiner

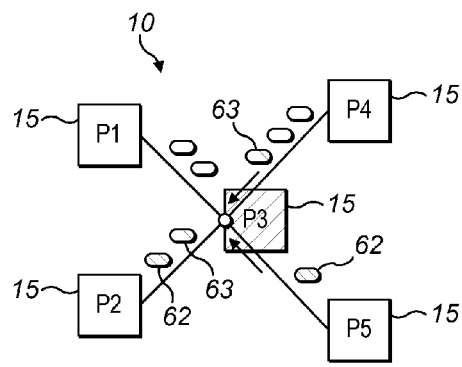
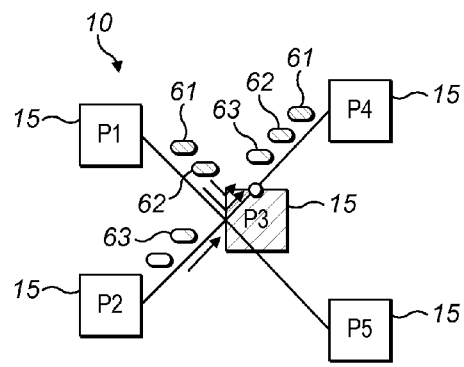
FIG. 12a    FIG. 12b
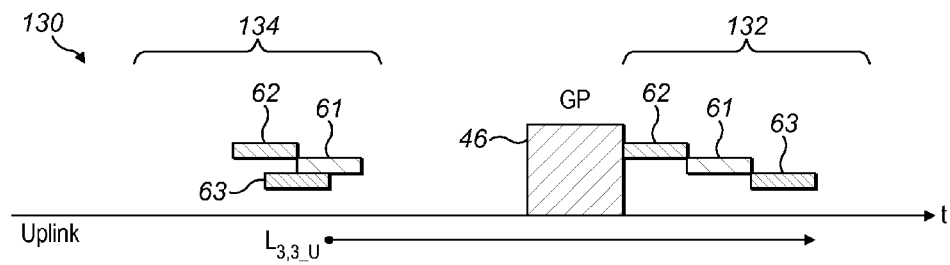
FIG. 13a
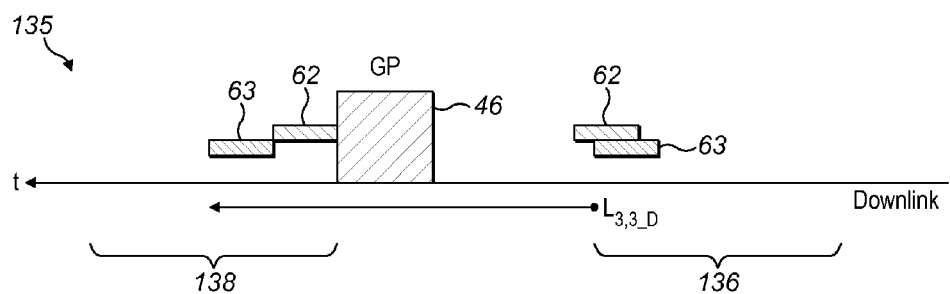
FIG. 13b

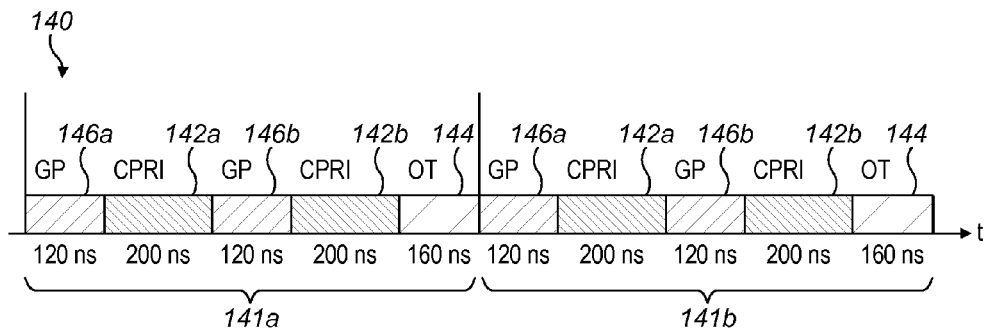
FIG. 14
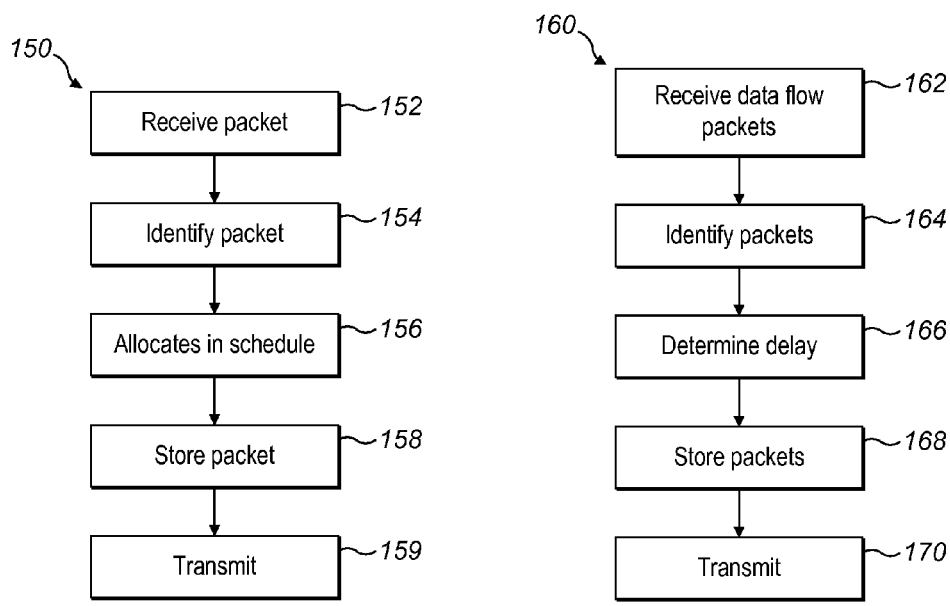
FIG. 15
FIG. 16

NETWORK NODE

TECHNICAL FIELD

Aspects of the invention relate to a network node configured to switch data packets between a Remote Radio Unit and a Digital Unit, a packet network comprising a plurality of network nodes configured to switch data packets between a Remote Radio Unit and a Digital Unit, a system of a plurality of Remote Radio Units and one or more Digital Unit and a packet network comprising a plurality of network nodes configured to switch data packets between a Remote Radio Unit and a Digital Unit, and a method of switching data packets between a Remote Radio Unit and a Digital Unit.

BACKGROUND

FIG. 1 shows a Radio Base Station (RBS) 100, which is known to be functionally separated into separate parts:
  A Radio Unit (RU) 102, which creates the analogue transmit RF signal from the BB signal to be fed to the antenna and digitizes the received RF signal.
  A Digital Unit (DU) 104, also termed a Baseband Unit (BBU) or Main Unit (MU), which generates and processes a digitized baseband (BB) Radio Frequency (RF) signal.

In a conventional mobile network, the antenna, RF equipment and the DU are integrated into a single network element and placed at the cell site. This requires power, real estate space, and relatively large cell towers. As cell sizes are getting smaller, more sites needs to be built and operated.

An option to address this issue is decoupling of the baseband processing function from the radio function, and location of the baseband processing function (DU) in a centralized site. RUs are placed in the remote antenna site and named as Remote Radio Units (RRU). Point to Point links are used for interconnection of DUs and RRUs.

An interface specification for communication between the DUs and RRUs is the Common Public Radio Interface (CPRI). In some examples, references to CPRI refer to CPRI Specification V6.0 (2013-08-30) Common Public Radio Interface (CPRI); Interface Specification. In CPRI standards reference, the DU 102 subsystem is named Radio Equipment Control (REC) and the RRU 104 subsystem is named Radio Equipment (RE), respectively.

It has been considered to provide a number of RRUs, distributed over a geographical area. Several DUs can be collected in centralized pool (sometimes referred to as a "baseband hotel") to control a large number of RRUs distributed over a geographical area. This network architecture may be referred to as Coordinated RAN, Cloud RAN or Centralized RAN (C-RAN).

In said C-RAN context, CPRI traffic must be transported over long distances between the DU site and the RRU site. This segment of the mobile traffic transport may be referred to as fronthaul. CPRI traffic has stringent latency, jitter and symmetry requirements. In particular: overall latency over the network is typically required to be within about 100 µs, asymmetry between the forward and reverse transmission shall be controlled in the order of a few tens of nanoseconds, and jitter of a few parts per billion (ppb) is also imposed by the CPRI specification.

With these tight requirements, transport of CPRI over traditional packet networks would be unfeasible due to, for example, Packet Delay Variation (PDV) and asymmetry which typically affect this environment.

SUMMARY

A first aspect of the present disclosure provides a network node configured to switch data packets between a Remote Radio Unit and a Digital Unit. The network node comprises one or more input port configured to receive said data packets and receive further packets having a destination other than one of a Remote Radio Unit and a Digital Unit. The node further comprises one or more output port configured to transmit said data packets and said further packets, and a scheduler configured to control transmission from the output port according to a scheduling cycle. The scheduler is configured to schedule only said data packets to be transmitted in a first period of the scheduling cycle, and schedule one or more of said further packets to be transmitted in a separate second period of the scheduling cycle.

Thus, contention among data packets between a Remote Radio Unit and a Digital Unit and further packets is avoided.

In some aspects, the network node is configured to transmit a said data packet from the output port at a predetermined time after receiving said data packet at the input port.

In some aspects, each data packet is associated with a flow between a Remote Radio Unit and a Digital Unit. Data packets associated with a first flow are transmitted after a first predetermined delay from the network node. Data packets associated with a second flow are transmitted after a second predetermined delay from the network node. The first predetermined delay is different to the second predetermined delay.

In some aspects, the network node is configured to delay packets of a first flow by a different amount of time in uplink and in downlink.

A second aspect of the present disclosure provides a packet network comprising a plurality of network nodes according to any example.

A third aspect of the present disclosure provides a system comprising a plurality of Remote Radio Units, one or more Digital units, and the packet network according to any example configured to connect a said Remote Radio Unit and a Digital unit.

A fourth aspect of the present disclosure provides a method of switching data packets between a Remote Radio Unit and a Digital Unit. The method comprises receiving said data packets and receiving further packets having a destination other than one of a Remote Radio Unit and a Digital Unit, and identifying said data packets and said further packets. The method further comprises allocating said data packets and said further packets to a scheduling cycle, and transmitting only said data packets in a first period of the scheduling cycle, and transmitting one or more of said further packets in a separate second period of the scheduling cycle.

A fifth aspect of the present disclosure provides a computer program product, configured when run on a computer to carry out a method as described.

BRIEF DESCRIPTION OF THE DRAWINGS

Embodiments of the present invention will now be described, by way of example only, with reference to the accompanying drawings in which:

FIGS. 12 and 12b are schematic diagrams of a part of the packet network according to an example of the disclosure;

FIGS. 13a and 13b are examples of a scheduling according to an example of the disclosure;

FIG. 14 is an example of a scheduling according to an example of the disclosure;

FIG. 15 a further example method of operation of the network node according to an example of the disclosure; and FIG. 16 a further example method of operation of the network node according to an example of the disclosure.

DETAILED DESCRIPTION

Aspects of the disclosure relate to transport of traffic over a packet fronthaul network between an RRU and DU. Aspects of the disclosure are intended to handle aspects particular to a packet switched fronthaul network, which uses packets to transmit data (e.g. user plane data) between a RRU and DU. Particular aspects which are considered are:

Asymmetry. Traffic in each of the two directions between RRU and DU takes a symmetric time to travel between the RRU and DU.

Contention of CPRI and non-CPRI flows on the same output port.

Contention of multiple CPRI flows on the same output port.

The disclosure refers to traffic, carried by packets, between a RRU and a DU. Such traffic, also referred to data flows, may in some examples use the CPRI protocol. Packets between a RRU and a DU may be referred to as CPRI packets or CPRI flows, by way of example only. Any reference to CPRI packets or CPRI flows, or other traffic descriptions referenced using CPRI, is an example only, and is not limited to the CPRI protocol. Alternative protocols between DU and RRU have been defined, e.g. Open Base Station Architecture Initiative (OBSAI). The same features are applicable also to such other protocols. For example, a reference to a CPRI packet or CPRI flow may also be replaced by, or referred to, as a packet or flow between a RRU and a DU. A packet between a RRU and a DU in either direction may alternatively be referred to as a RRU-DU packet.

Aspects of the disclosure allow the network nodes to use only a stable frequency reference as a timing reference, e.g. as provided by a suitable free running oscillator (e.g. crystal oscillator, and in some examples, a Temperature-compensated crystal oscillator, TCXO)). A common timing reference distributed to the network nodes is not required.

Use of a packet network for fronthaul may allow use of an existing Ethernet cable infrastructure to encapsulate and transport data between a RRU and a DU, e.g. using CPRI. Ethernet services are commonly available at low cost. As explained before, mapping data between a RRU and a DU, e.g. using CPRI, over Ethernet and over packet is enabled by aspects of the disclosure to handle the particular requirements CPRI of delays, asymmetries and contentions in packet nodes.

Aspects of the disclosure do not require distribution of timing references (e.g. using PTP (IEEE1588) timing synchronization. This approach facilitates transport of CPRI traffic across multi-operator environments.

Figure 1:
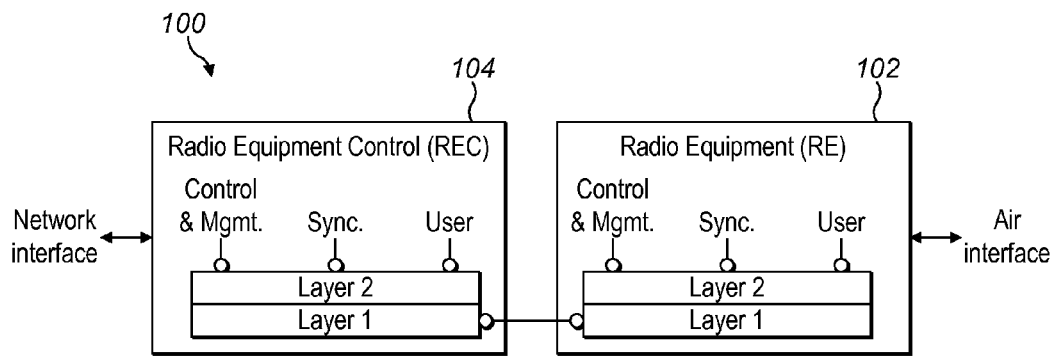
FIG. 1 is prior art illustration of a Remote Radio Unit and a Digital Unit.
Figure 2:
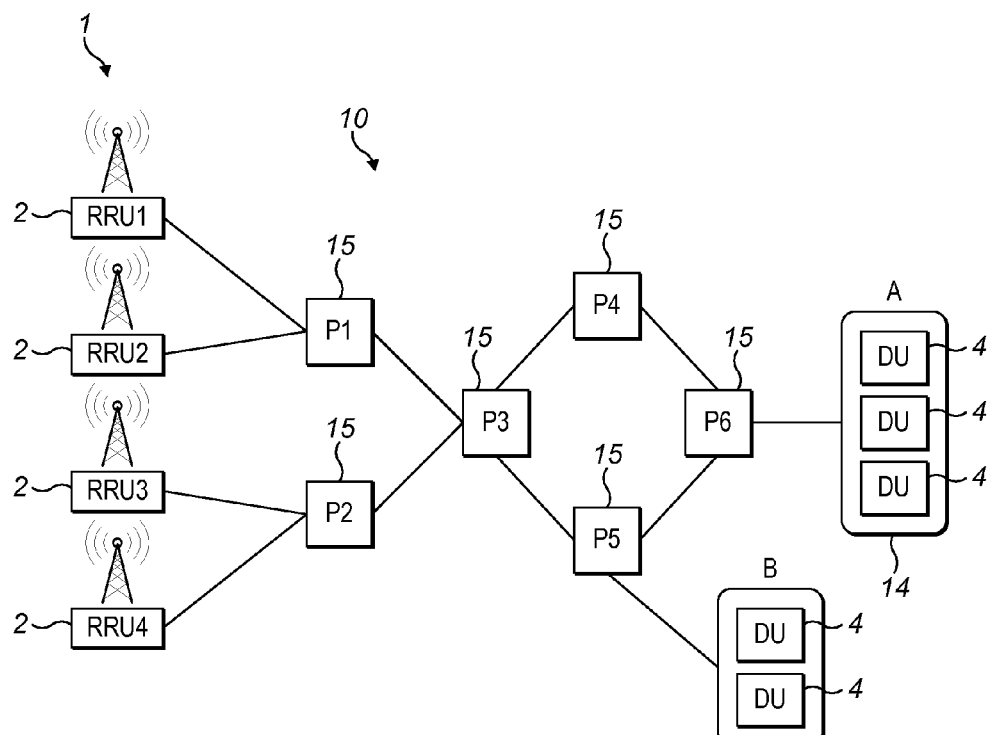
FIG. 2 is a schematic diagram of a system including a packet network according to an example of the disclosure.

FIG. 2 illustrates an example network or system 1 comprising a centralized baseband processing based on RRUs 2 and one or more DUs 4 communicating via data packet flows. In this example, an RRU 2 is located at each of four macro cell sites. The DUs 4 are optionally located in one or more baseband hotels 14. In this example, one or more DU is hosted by each of two baseband hotels 14, labelled as A and B. The system 1 may be considered to be, or be a part of, an access network for a cellular communications network. The Remote Radio Units 2 are configured to communication with User Equipment (e.g. a mobile phone) over an air interface. The system 1 is applicable to any Radio Access Technology, e.g. Long Term Evolution (LTE).

Aspects of the disclosure relate to transfer of flows between an RRU and DU. The flows may include data relating to any of a Control Plane, Management Plane, User Plane or Synchronization. In some aspects, a Control data flow is used for call processing. Management Plane data is for management information for the operation, administration and maintenance of the CPRI link and the nodes. User Plane data has to be transferred from the radio base station to the mobile station (UE) and vice versa. The Synchronization data flow transfers synchronization and timing information between nodes. Any of such flows between RRU and DU may be considered as a data flow between a RRU and DU. Such data flows are transmitted in packets in examples of the invention. Data between the RRU and DU may use the CPRI interface standard, and so without limitation as to the protocol used, may be referred to as CPRI packets.

A packet network 10 connects the RRUs 2 and DUs 4. In this example, the packet network comprises six nodes or network elements 15. The nodes 20 are labelled as P1 to P6. One or more of the nodes 20 has a plurality of ports for transmitting or receiving flows towards the RRUs, and/or a plurality of ports for transmitting or receiving flows towards the DUs. The packet network is configured to switch traffic of the flows at the nodes according to information carried in the packets, e.g. in a header of the packets. The packets are not restricted to being sent from the RRUs or DUs in defined slots. The packet network is a packet switched network, in contrast to a time division multiplexed (TDM) network.

The nodes 15 are connected to each other and to the RRUs 2 and DUs. In some aspects, an optical connection (optical physical layer) is used to connect nodes and/or nodes and an RRU/DU. For example, an optical fiber carries the data flows. In some examples, the packet network 10 comprises at least one connection between two nodes 15. Flows between a RRU 2 and DU 4 pass through at least one node 15.

Communication between the RRU and DU is by data flows, for example CPRI data flows. A flow from a RRU to a DU is considered to be in uplink (UL), while a flow in the opposite direction from a DU to a RRU is considered to be in downlink (DL). A particular data flow is considered to be between a specific RRU and a specific DU (or a specific baseband hotel 14). For example, different flows provide communication for different RRUs.

Figure 3:
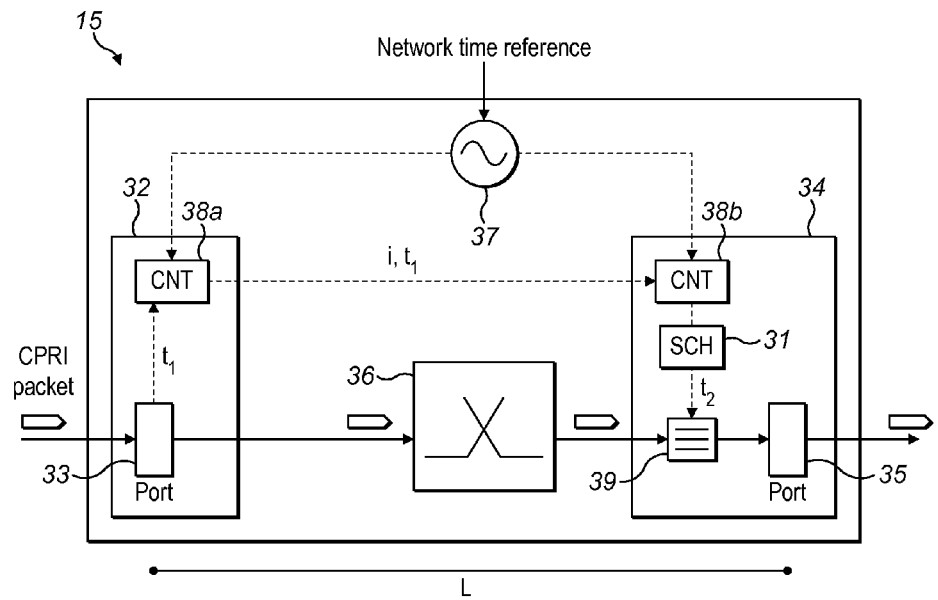
FIG. 3 is a schematic illustration of a network node according to an example of the disclosure.

FIG. 3 illustrates functional blocks of a node 15 of the packet network 10. The node 15 is configured to implement aspects of the described method. In this example, a single input card and a single output card of the node 15 is shown. The node 15 typically comprises a plurality of input cards and/or a plurality of output cards. The network node 15 is configured to switch data packets between a Remote Radio Unit and a Digital Unit.

The node 15 comprises an input traffic card 32 configured to receive packet traffic, e.g. CPRI traffic. The packets are received at an input port 33 of the input traffic card 32. The node 15 further comprises an output traffic card 34 configured to transmit traffic, e.g. CPRI traffic. The packets are transmitted from an input port 35 of the output traffic card 34. In some aspects, the output traffic card 34 further comprises a dedicated output queue for high priority traffic. The input traffic card 32 and output traffic card 34 are connected by a switching matrix 36. The switching matrix 36 provides for the node 15 to function as a packet switch.

The node 15 comprises a system clock 37. Optionally, the system clock 37 is locked to a network timing reference. In some examples, the network timing reference is based on Synchronous Ethernet (SyncE). The system clock 37 provides an accurate timing reference to the input traffic card 32 and output traffic card 34.

In some examples, the input traffic card 32 comprises a first counter 38a and the output traffic card 34 comprises a second counter 38b. The counter 38a is configured to record a time at which a packet is received. The second counter 38b provides an input to a scheduler 31.

The scheduler 31 is located in the output traffic card 34. The scheduler 31 is configured to control the one or more buffers (queue) 39 of the output traffic card 34. The scheduler 31 is configured to control packets transmitted by the output port 35.

The first and second counters 38a,38b are configured to determine the time delay provided to a packet between being received and transmitting from the node 15. When the second counter 38b reaches a specific value indicating the predetermined or fixed delay has been reached, the second counter 38b is configured to send a signal to the Scheduler 31. The specific value indicating the fixed delay has been reached is calculated by the second counter 38b or a separate controller, based on the arrival time of the packet (e.g. as measured by the first counter 38a) and the predetermined delay to be added to a packet from that data flow.

The signal sent by the second counter 38b indicates to the Scheduler 31 to read data from the output buffer 39. The Scheduler 31 is configured to control the buffer (packet queue) to then send the corresponding packet. In some aspects, the sending of the corresponding packet is in accordance with a scheduling cycle, as described below.

As such, the network node is configured to transmit a said data packet from the output port at a predetermined time after receiving said data packet at the input port.

In some aspects, the counter 38b may be considered as, or connected to, a controller configured to control the time delay provided to packets traversing the network node 15.

In some aspects, one or more of the counters 38a,38b in the cards are phase aligned (e.g. via a 1 pulse per second (PPS) signal). Optionally, the system clock 37 is locked to a network timing reference (e.g. based on Synchronous Ethernet). Alternatively, a free running oscillator provides sufficient accuracy for implementation of the described method.

The scheduler 31 is configured to determine if further packets, not between a RRU and DU, can be sent without conflicting with packets between a RRU and DU. In some examples, the scheduler 31 makes this determination at every scheduling cycle, as will be described in more detail below.

The one or more input port of the network node is configured to receive said data packets and receive further packets having a destination other than one of a Remote Radio Unit and a Digital Unit. The one or more output port configured to transmit said data packets and said further packets. The network node 15 further comprises a scheduler configured to control transmission from the output port according to the scheduling cycle. In some aspects, only said data packets are transmitted in a first period of a scheduling cycle, and one or more of said further packets in a separate second period of the scheduling cycle.

In some aspects, the network node 15 comprises a counter 32 configured to register an arrival time at the input port of a said data packet, and an internal clock 37. The network node is configured to transmit said data packet from the output port 35 at a predetermined time after the registered arrival time, based on the timing provided by the internal clock 37.

Aspects of the disclosure provide for symmetry in time between uplink and downlink and contention avoidance among CPRI flows.

Aspects of the disclosure counteract asymmetry, by providing a predetermined or fixed delay in each traversed node 15. The fixed delays provide equal delays for packets transmitted in the two directions (i.e. uplink and downlink).

In order to ensure symmetry between the two directions, the packet network implements a fixed latency method.

Figure 4:
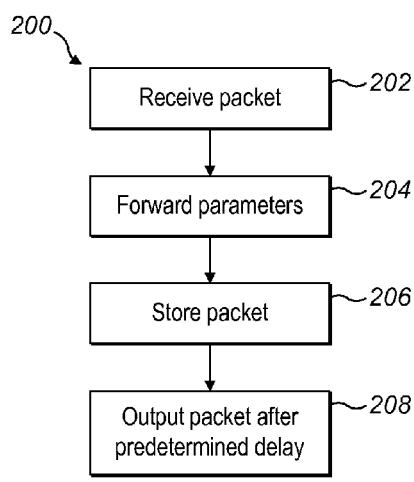
FIG. 4 is an example method of operation of the network node according to an example of the disclosure.

FIG. 4 shows an example fixed latency method 200, with reference to the node 15 shown in FIG. 3. The method 200 provides a predetermined, controllable, delay to a packet traversing the node 15.

In 202, a packet i, carrying part of a CPRI flow, enters a node 15 of the packet network 10 and triggers the input counter 38a in the input traffic card 32. The arrival time $t_1$ is registered as close as possible to the system clock.

In 204, the two parameters i and $t_1$ are forwarded to the output traffic card.

In 206, packet i is stored in a high priority queue, in the output traffic card. The packet i is stored until a time $t_2$. In some aspects, the high priority queue is specific to data flows between a RRU and a DU.

In 208, at time $t_2$, the packet is forwarded towards the output port. $t_2$ is calculated so that $t_2-t_1=L$, wherein L is a fixed delay. Thus, the packet is stored for a fixed delay, and so takes a known and pre-determined time to transmit through the node 15. The fixed delay L is a very short time, for example, 1 μs or 2 μs. This ensures that the stringent latency requirements of CPRI. Different values may be selected, so long as the end-to-end latency requirement is satisfied. In some examples the fixed delay L is less than 5 μs or less than 3 μs.

The same delay L is implemented (or forced) for packets transmitted in the opposite direction. This guarantees a requirement of communication between RRU and DU (e.g. using a CPRI interface), namely symmetry in the two directions. The packets having a predetermined (symmetrical) delay may carry any type of information between RRU and DU, including user data.

Figure 5:
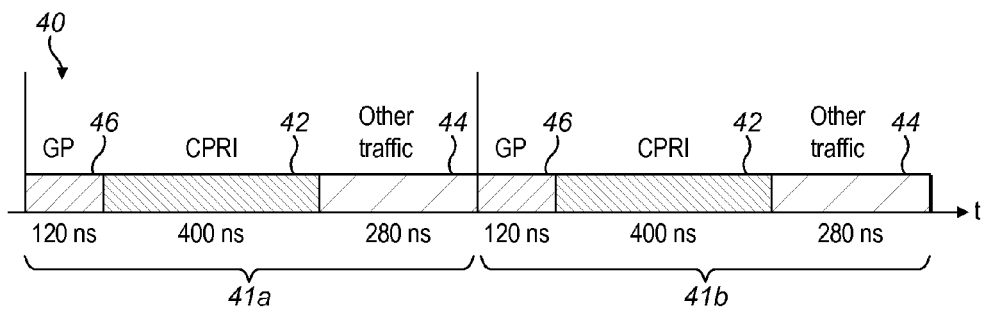
FIG. 5 is an example of a scheduling according to an example of the disclosure.

FIG. 5 illustrates an example scheduling 40 of the transmissions from a node 15, e.g. from the output traffic card 34. The scheduling 40 as shown comprises two cycles 41a, 41b. The two cycles 41a, 41b are identical, and are sequentially followed by further such cycles. An example cycle 41a comprises a first period 42 of time in which only CPRI traffic is scheduled to be transmitted by the node 15.

The cycle 41a further comprises a second period 44 of time in which other traffic is scheduled to be transmitted by the node 15. The other traffic may be considered as traffic which is not between a RRU and a DU. Other traffic may also be referred to as further traffic.

The other traffic may be considered as non-CPRI traffic, for example, when CPRI traffic provides communication between the RRU and DU. In some aspects, the other traffic is traffic which is not related to RRU-DU communication or fronthaul communication between remote parts of a base station. The other traffic has a different destination or source than the RRU or DU. In some aspects, the fronthaul transport network may be considered as deployed over the same infrastructure used to transmit other packet traffic types. The use of packets to transmit data between a RRU and DU allows use of generic packet network technology.

The separate scheduling of CPRI and non-CPRI traffic ensures capacity for the CPRI traffic. In some aspects, non-CPRI (other) traffic may be considered as packets other than traffic exchanged between the DU and RRU.

In an aspect of the apparatus and method of the disclosure, a packet node 14 reserves a portion of its capacity for CPRI traffic. The remaining capacity is dedicated to other traffic (not between RRU and DU, e.g. non-CPRI traffic). Such Other traffic may be considered as low priority, best effort, traffic. The scheduler 31 implements this separation of RRU-DU traffic (e.g. using CPRI) and other traffic (e.g. non-CPRI traffic).

In some aspects, the scheduler is configured to schedule only said data packets to be transmitted in a first period of the scheduling cycle. As such, only packets of one or more flows between a RRU and a DU are scheduled for the first period. The scheduler is also configured to schedule one or more of said further packets to be transmitted in a separate second period of the scheduling cycle. This ensures that the further packets are separated from the traffic between a RRU and DU.

The cycle 41a further comprises a guard period 46. The guard period 46 is configured to follow the second period 44, and preceding the first period 44. As such, the guard period 46 is immediately prior to the first period 42 reserved for traffic between a RRU and DU. In the guard period 46, no packets are scheduled to start transmission. This ensures that transmission of RRU-DU (e.g. CPRI) traffic in the first period can reliably start at the scheduled time. The guard period 46 provides for collision avoidance.

In some examples of the guard period, transmission of a data packet or further packet is not initiated, or transmission of the data packet or further packet is completed before the end of the guard period.

In this example, a cycle 41a is shown with a guard period 46 first, followed by the first period 42 of CPRI traffic, and then the second period 44 of other traffic. On transmission of the following cycle 41b, the guard period 46 immediately follows the second period 44, as described above. Thus, the functionality of the cycles may be spread over more than one cycle 41a,41b. Alternatively, each cycle may comprise a different ordering of the periods. For example, a cycle may be defined as having the second period 44 initially, followed by the guard period 46, followed by the first period 42 for RRU-DU (e.g. CPRI) traffic.

The guard period 46 may be for a fixed length of time, or a variable (flexible) length of time. If the guard period has a variable length, the guard period may be controlled according to a length of packet being transmitted.

In some aspects, each Other (e.g. non-CPRI) traffic packet (or RRU-DU packet) is associated with an indicator of the time at which transmission of the packet is completed. For example, the indicator is an "end transmission time" label or a "transmission time" label. The scheduler 31 is configured to use the indicator to determine which packet can be sent in order within the guard period, i.e. to avoid a collision with the RRU-DU packets. In some examples, the scheduler 31 makes this determination at every cycle 41a,41b.

In some aspects, the length of the guard period 46 is based on the longest packet expected and on the link speed. In a further aspect, the node determines a packet characteristic, e.g. checking the actual length of the packet to be sent. The scheduler 31 is configured to verify that there is sufficient time before the next RRU-DU packet to be sent out on the same port.

In an example, the scheduler 31 is configured to check a length of an Other packet (i.e. not between RRU and DU), and determines whether the Other traffic packet can be sent. In some aspects, the Other traffic packets may be sent before or after the start of the Guard Period 46, so long as the Other traffic packet has finished sending before the end of the Guard Period.

In some aspects, the length of the Guard Period 46 is varied to be equal to (or a predetermined amount longer than) a length of the packet to be sent or a longest packet length. The length of guard period is controlled accorder to a determined length of the packet to be sent, such that the transmission of the packet does not extend beyond the guard period.

In one example, for a guard period 46 which is fixed, the length of the guard period is equal to a maximum transmission time of a Layer 2 frame. For examples, the guard period is equal to a Maximum Transmission Unit (MTU) of an Ethernet frame, e.g. 1500 bytes. This corresponds, in a 100 Gbps link, to 120 ns. In an example, the time of the second period 44 is 280 ns, which is reserved to Other (not between RRU and DU) traffic. In the example shown, the first period 42 is 400 ns. The scheduler 31 is configured to stop or avoid sending all Other traffic (not between RRU and DU), irrespectively of the length of the Other type packet during this guard period.

In an example, a cluster of 20 RRUs 2 are connected to a pool of DUs 4. The 20 CPRI flows, for example at 2.5 Gbps, are transported over a 100 Gbps link. For example, the link may be optical link, for example a wavelength in a wavelength division multiplexed (WDM) comb. Each flow is split in packets of 256 bytes (i.e. 2048 bits). Each packet requires 20 ns to be transmitted at 100 Gbps. As a consequence, the 20 CPRI flows has a cumulative transit time of 20*20 ns=400 ns. These CPRI flows can be transmitted with the first period 42.

In some examples, a guard interval between the CPRI packets is provided to avoid collisions between CPRI packets. The guard interval allows for potential wander and frequency differences among the packet flows. In addition, to avoid collisions among CPRI and non-CPRI traffic, guard periods 46 are be used.

Figure 6:
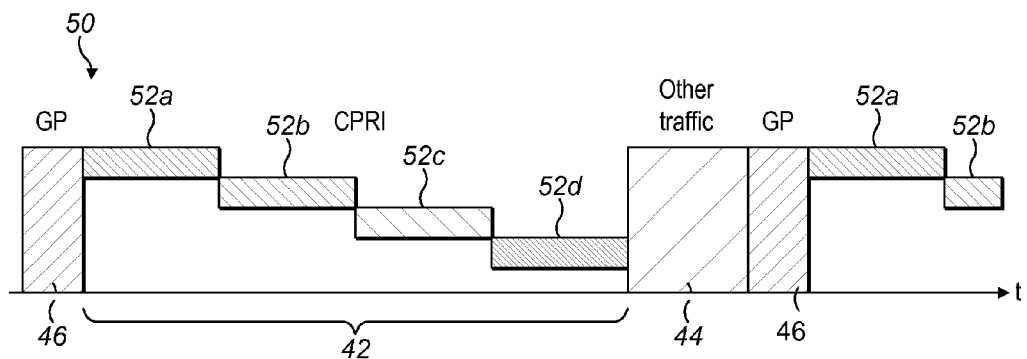
FIG. 6 is a further example of a scheduling according to an example of the disclosure.

FIG. 6 shows an example illustration of a traffic sequence 50, as described above. The sequence 50 comprises the guard period 46. The sequence 50 illustrates a plurality of packets of data flows 52a,52b,52c,52d within the first period 42. In this example, four data (e.g. CPRI) flows are shown. The disclosure is not limited to this number of flows. The second period 44 follows the first period. As described above, the second period 44 provides a time for transmission of other (non-CPRI) traffic. The second period 44 is followed by a guard period 46.

Figure 7:
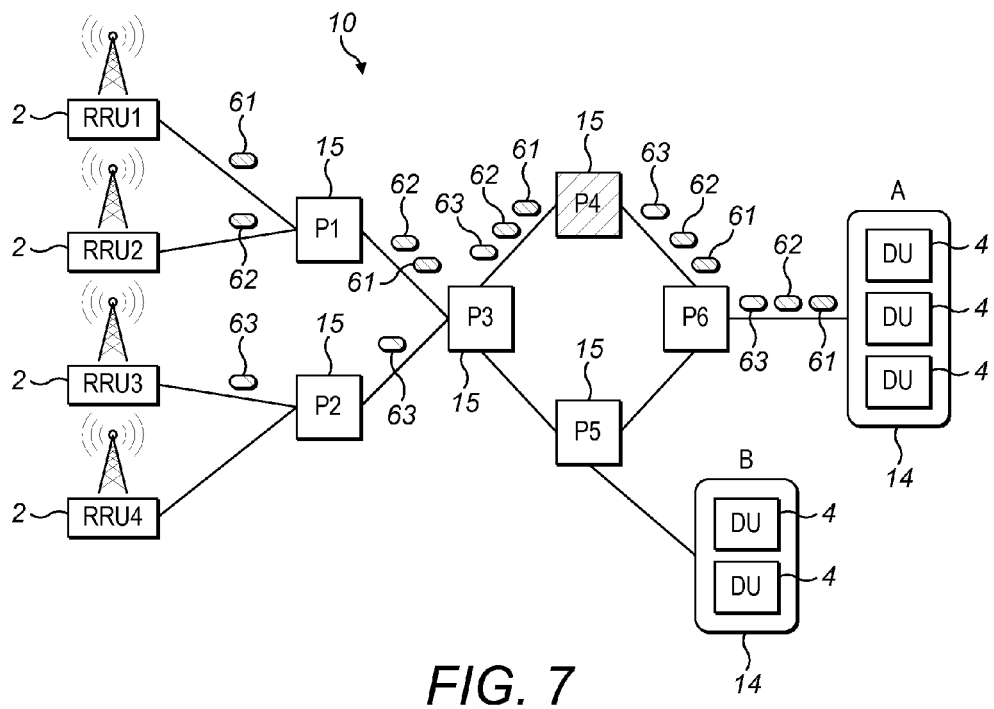
FIG. 7 is a schematic diagram of a system including a packet network according to an example of the disclosure.

FIG. 7 illustrates packets of three flows traversing the packet network 10 in uplink. The packets of the flows are termed packets of a first flow 61, second flow 62 and third flow 63. Each of the three flows originates at a different RRU 2. Each flow comprises packets containing data exchanged between a RRU and DU, e.g. using CPRI. In this example, all flows are destined for one or more DUs 2 in the same baseband hotel 14, although this is an example only. The plurality of flows 61,62,63 cross a same intermediate node P4, which is an example of node 15 as described. For packets belonging to the same flow, the time to traverse the node P4 in the two directions (uplink and downlink) shall be the same. For example, a fixed delay is applied for a particular flow, as described above.

For packets of the first flow 61 (between RRU1 and DU pool A), a first fixed delay $L_{4,1}$ is imposed in both directions at node P4, in uplink and downlink. For the second flow 62 (between RRU2 and DU pool A), a second fixed delay $L_{4,2}$ is imposed in the two directions, uplink and downlink. Similarly, for the third flow 63 (between RRU3 and DU pool A), a third fixed delay is provided at node P4, the same third delay $L_{4,3}$ being applied in each direction for the third flow.

Figure 8A:
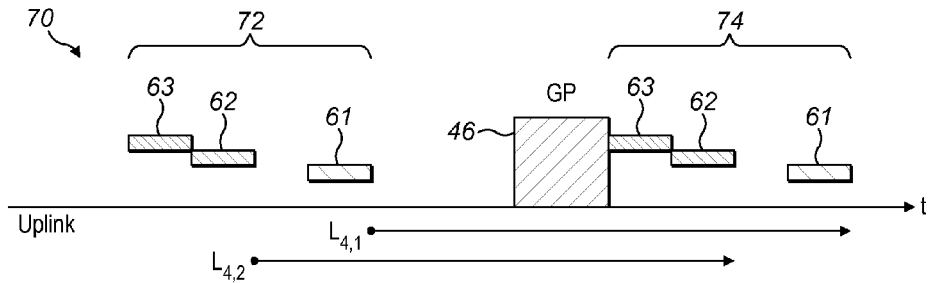
FIGS. 8a and 8b are examples of a scheduling according to an example of the disclosure.

FIG. 8a illustrates a timeline 70 for the uplink direction in an example node 15, e.g. node P4. As described, a packet of a first flow 61, second flow 62 and third flow 63 are shown arriving at the node 15 in a receive time window 72. The same packets of the first flow 61, second flow 62 and third flow 63 are shown transmitted from the node in a transmit time window 74 (corresponding to the first period 42). Fixed delay value $L_{4,1}$ for the first flow 61 and fixed delay value $L_{4,2}$ for the second flow 62 are shown. The data flows 61,62,63 are transmitted following the guard period 46. The receive time window may not limit the arrival of packets; the time window is shown merely to indicate arriving packets.

In some aspects, the predetermined delay for a packet to cross the node 15 is the same for a plurality of the flows. In some examples, the fixed delay value for a packet is the same for each flow handled by a node. The fixed delay values $L_{4,i}$ for packets i of any flow may be the same. The fixed delay values $L_{4,i}$ are predetermined, for example by considering the packet node capability and trying to minimize the end to end latency. In some examples, up to 2 μS per node delay may be used. Fixed delays, in a given node, should be the same for all CPRI packets irrespectively of the originating RRU. As such, the fixed delay is independent of the flow. The fixed delay is the same, independent of the RRU or DU transmitting or receiving. In this case, the fixed delay $L_{4,i}$ may be considered as independent from i.

Figure 8B:
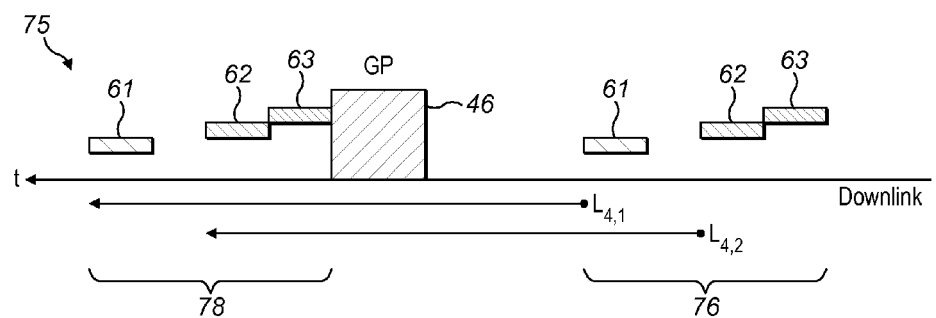

FIG. 8b illustrates a timeline 75 for the downlink direction in an example node 15, e.g. node P4. As described, a packet of a first flow 61, second flow 62 and third flow 63 are shown arriving at the node 15 in a receive time window 76. Note that time is running right to left. The same packets of the first flow 61, second flow 62 and third flow 63 are shown transmitted from the node in a transmit time window 78 (corresponding to the first period 42). Fixed delay value $L_{4,1}$ for the first flow 61 and fixed delay value $L_{4,2}$ for the second flow 62 are shown. The time delays for a particular flow are the same in uplink and downlink, independently of whether the delay is the same for different flows. The data flows 61,62,63 are transmitted following the guard period 46.

In some aspects, this implementation of a same fixed delay to transit a node 15 for any flow is a default setting, which may be varied as described below. The requirement for a uniform fixed delay can be relaxed to avoid contention among CPRI flows.

Data flows (e.g. CPRI flow) are generated in uplink (UL) from RRU to DU and in downlink (DL) from DU to RRU. RRUs 2 are independent sources, being the radio traffic driven by user equipment. As a consequence, contentions are possible, especially in the uplink direction. Contentions are possible also in the downlink direction, for example, where CPRI flows come from different DU pools or baseband hotels 14.

Collisions between packets may have a significant impact due to the very stringent RRU-DU (e.g. CPRI) requirements. For example, in a Consider for example a scenario where the maximum tolerated asymmetry is in the order of a few tens of ns (time error=asymmetry/2; 65 ns being the max allowed end-to-end time error). In some examples, this is a multiple-input and multiple-output (MIMO) scenario in the access network. In case of a collision, a packet, transported at 100 Gbit/s as in the previous example should wait at least 20 ns for a new transmission slot in a node. This delay could cumulate with similar collision delays in other traversed nodes and with the propagation delays over the links. In addition, especially in lower speed links, latency could be significantly impacted.

In the packet network 10 described between RRUs and DUs, carrying radio data in packets (e.g. using CPRI), it is important that collisions between such packets are avoided, or reduced in a minimum number of events.

Figure 9:
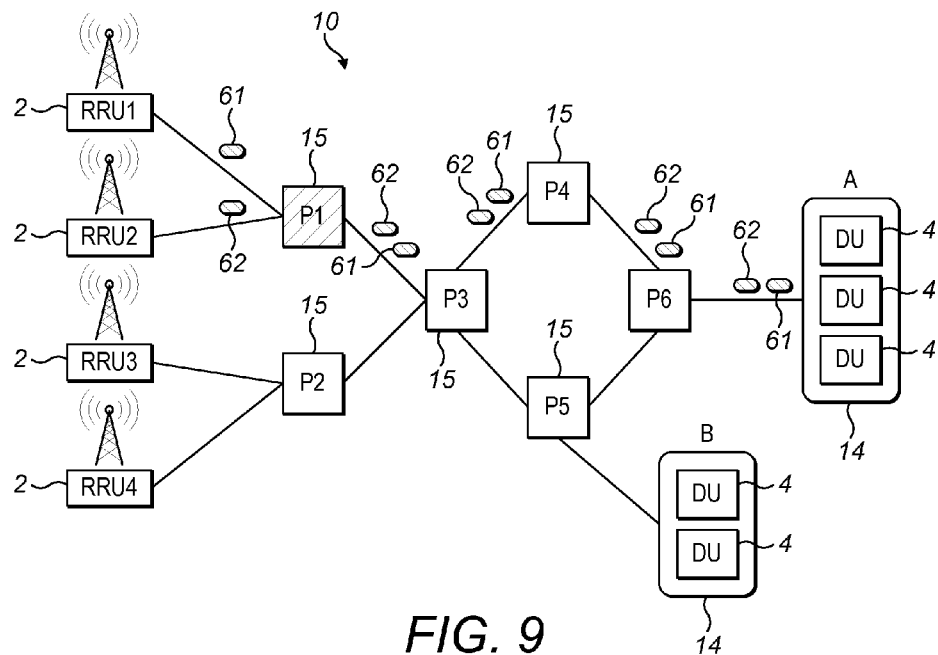
FIG. 9 is a schematic diagram of a system including a packet network according to an example of the disclosure.

FIG. 9 illustrates a further example of the first flow and the second flow crossing an intermediate node 15. In this example node P1 is shown, although the same is applicable to any node 15 of the fronthaul packet network 10. As already described, for packets belonging to the same flow, the time to traverse the node in the two directions (UL and DL) is the same. In this example, a first fixed delay $L_{1,1}$ is imposed for UL and DL of packets of the first flow 61, and a second fixed delay $L_{1,2}$ is imposed for UL and DL of packets of the second flow 62.

In this example, the first and second flows 61,62 (associated with RRU1 and with RRU2 respectively) arrive in the node P1 from different links. Both the first flow 61 and second flow 62 are switched to the same output port, for example, due to having the same destination baseband hotel 14 (A). In this case, the packets of the first and second flows 61,62 are at least partially overlapping in their arrival time at the node 15. For example, at least a part of the packet of the first flow is received at the same time as at least a part of the packet of the second flow. The packets of the first and second flows are received on different input ports, and so this coincident receiving is not itself a contention. The overlapping packets are shown in the receive time window 72.

Contentions, also referred to as collisions, may occur when data packets of the first and second flows are received at different input ports and transmitted on the same output port. In this example, at least partially overlapping arrival times provide a risk of collision on the outgoing port if the same fixed delay is applied to the first and second flows, i.e. if $L_{1,1}$ is equal to $L_{1,2}$.

Aspects of the disclosure provide for different fixed delays to be implemented for different packet flows. In some aspects, the fixed delay at a node 15 is different for packets of different CPRI flows (i.e. between different RRUs and/or DUs or baseband hotels). The node 15 is configured to provide a predetermined delay to transit the node, wherein the predetermined delay is different for different flows. This avoids a collision on the outgoing port. In some examples, a determination is made of whether packets of separate flows will collide at an output port. If it is determined that a collision will occur, the different delay for separate flows is provided by the node 15. In some examples, if no collision is determined to occur, the flows have the same fixed delay.

In some examples, the node 15 determines which packet arrives first of the packets expected to collide. In this example, the packet of the second flow 62 arrives before the packet of the first flow 61. The earlier arriving packet of the packets expected to collide is controlled to have a shorter time delay than a delay of the later arriving packet(s) of the packets expected to collide. In this example, the earlier arriving packet of the second flow 62 has a smaller fixed delay ($L_{1,2}$) than a delay ($L_{1,1}$) of the later arriving packet of the first flow. In this example, $L_{1,1} > L_{1,2}$. This avoids a collision on the output port.

In some examples, each data packet is associated with a flow between a Remote Radio Unit and a Digital Unit. Data packets associated with a first flow are transmitted after a first predetermined delay from the network node. Data packets associated with a second flow are transmitted after a second predetermined delay from the network node. The first predetermined delay is different to the second predetermined delay.

Figure 10A:
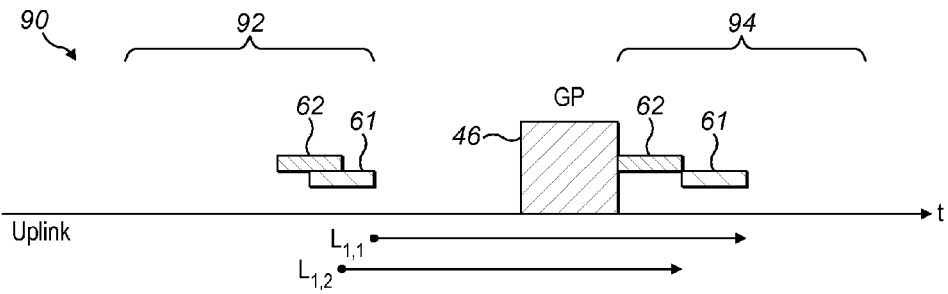
FIGS. 10a and 10b are examples of a scheduling according to an example of the disclosure.

FIG. 10*a* illustrates a timeline 90 for the uplink direction in an example node 15, e.g. node P1. As described, a packet of a first flow 61 and second flow 62 are shown arriving at the node 15 in a receive time window 92. The same packets of the first flow 61 and second flow 62 are shown transmitted from the node in a transmit time window 94 (corresponding to the first period 42). Fixed (predetermined) delay value $L_{1,1}$ for the first flow 61 and fixed (predetermined) delay value $L_{1,2}$ for the second flow 62 are shown. The data flows 61,62,63 are transmitted following the guard period 46. The receive time window may not limit the arrival of packets; the time window is shown merely to indicate arriving packets.

The delay values applied to the packets may be considered as predetermined in that a controlled delay is applied to the packet prior to transmission. In some examples, the network node 15 may not be aware of the contention until receiving two potentially colliding packets, at which time the delay is adjusted to avoid the collision. The predetermined delay to be applied to a particular packet may be known prior to the packet arriving, or only after the packet has arrived.

The packets do not overlap or collide in the transmit time window 94. In some examples, the fixed delays for the packets expected to collide, e.g. of the first and second flows, are determined such that the later packet immediately follows the earlier packet in transmission from the output port.

In some aspects, the network node is configured to control the first and/or second predetermined delay such that for a said data packet of the first flow which arrives prior to, and at least partially overlapping in time with a said data packet of the second flow, the first predetermined delay is less than the second predetermined delay.

The same predetermined (fixed) delay for the first and second flows is applied also in the opposite direction. This ensures that each flow is symmetric in time, even when different flows have different delays at a particular node. The network node is configured to delay packets of a first flow by a same amount of time in uplink and in downlink.

Figure 10B:
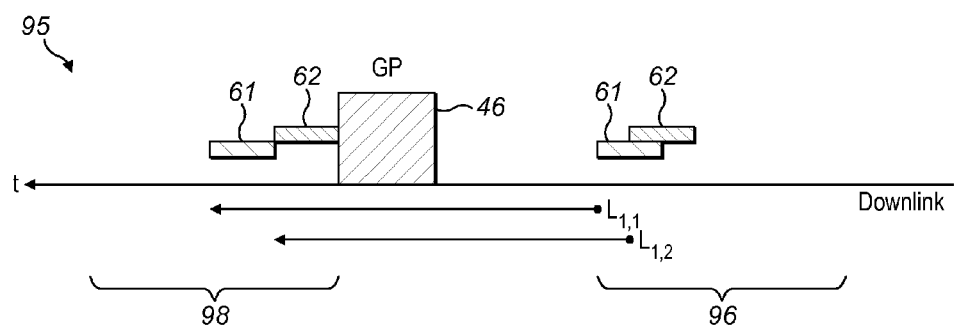

FIG. 10*b* shows the reverse direction at the node 15. The same differentiation is required on the reverse direction. Arriving packets in time window 96 from different flows 61,62 which would collide in receive time window 96 are delayed by a controlled, and different, length of time to avoid the collision in transmit time window 98.

Figure 11:
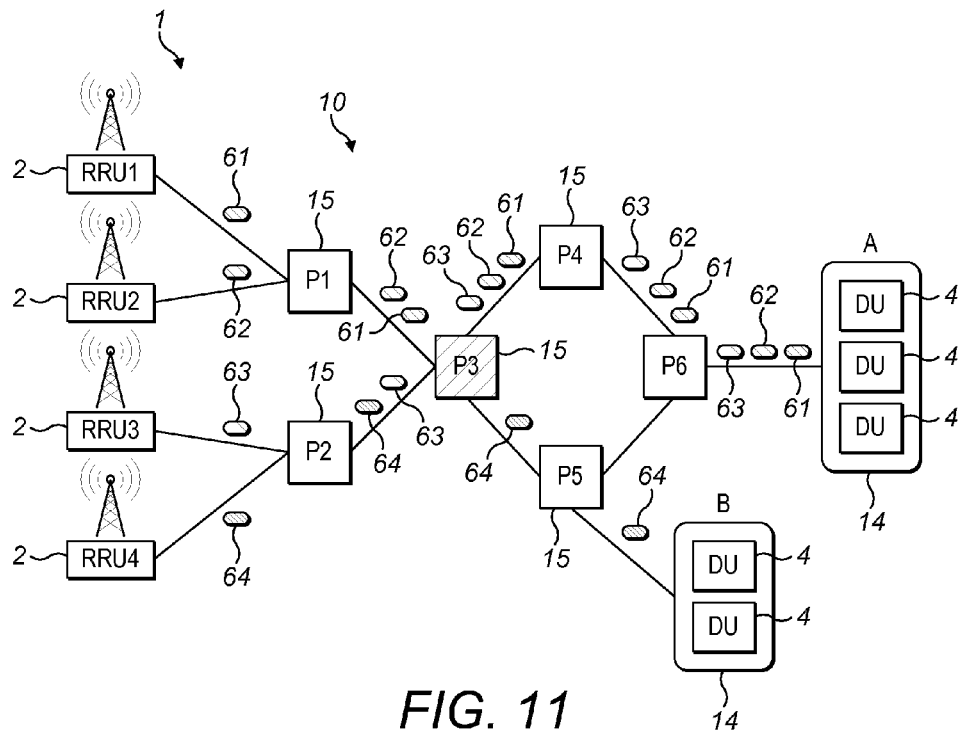
FIG. 11 is a schematic diagram of a system including a packet network according to an example of the disclosure.

FIG. 11 illustrates a further example of the packet network 10 handling packets of CPRI flows. In this example, a plurality of CPRI flows are handed by a node 15, which is described with respect to node P3 as an example. In this example, flows from a plurality of RRUs converge at the node P3. The flows are associated with a multiple DUs and/or multiple baseband hotels 14. In this example, packets of a first flow 61, second flow 62 and third flow 63 are directed to the first baseband hotel A 14, and packets of a fourth flow 64 are directed to a second baseband hotel B 14. In some examples, the two baseband hotels 14 are in different geographic locations.

Time asymmetry for each flow can be avoided or reduced as described above, e.g. by imposing a same fixed delay for traversing the node (e.g. node P3), for each flow, in the two opposite directions.

Collisions at a node 15 may occur in the uplink direction and/or in the downlink direction. A collision may occur when packets are received at two different ports (either in uplink or downlink), and output onto a single port of the node for further transmission. The node 15 may be handling CPRI flows which have packets in both uplink and downlink. To avoid time asymmetry, a same delay is used for each flow in uplink and downlink at a node 15. A need to avoid a collision in downlink may provide a condition on the fixed delay used. A need to avoid a collision in uplink may provide a different condition on the fixed delay used.

FIG. 12*a* shows a packet of the second flow 62 and a packet of the third flow 63 arriving at node P3 in downlink. The packets are output to the same port (to node P2), which may indicate a delay for the second and third flows to avoid a collision in downlink.

FIG. 12*b* shows a packet of the first flow 61, a packet of the second flow 62 and a packet of the third flow 63 arriving at node P3 in uplink. The packets are output to the same port (to node P4). The network node is configured to control a delay for the first, second and third flows to avoid a collision in uplink.

A collision, as shown in FIG. 12*a*, can occur in different directions and involving different flows. FIG. 12*a* shows a potential collision in DL between traffic directed to RRU3 and traffic to RRU4. FIG. 12*b* shows a potential collision in UL among traffic coming from RRU1, RRU2 and RRU3 and directed to P4.

In some aspects, two independent different conditions or constraints are imposed on the fixed delay (latency) applied to, for example, the third flow in P3. One constraint is imposed by DL collision (as in FIG. 12*a*); another constraint is imposed by UL collision (as in FIG. 12*b*).

Aspects of the disclosure determine the delay for each node, for each direction and for each flow. The determination of the delay is based on the above described constraints, i.e. avoiding collisions among CPRI packets in uplink and downlink, and providing the same delay for packets of the same flow across each node and/or across the packet network 10. In some examples, a cumulated end-to-end latency of each flow also imposes a constraint. In some examples, the delay for a particular flow at each node is controlled, and may differ from other nodes, to avoid or reduce collisions and meet such constraints.

All these constraints shall be considered in selecting the L fixed delays for each node, for each direction, for each flow.

FIGS. 13a and 13b illustrate how the requirement to avoid conflicts in uplink and downlink shown in FIGS. 11a and 11b may be solved by the network node 15 providing different delays in uplink and downlink for the third flow.

FIG. 13a shows a timeline 130 for the uplink direction, the packet of the third flow 63 is received within a receive window 132 and transmitted in a time window 134. The packet of the third flow 63 delayed by at least an uplink fixed delay $L_{3,3\_U}$ to avoid overlap with packets of the first flow 61 and second flow 62 coming from a different input port.

FIG. 13b shows a timeline 135 for the downlink direction. In the downlink direction, the packet of the third flow 63 is delayed at least a downlink predetermined delay $L_{3,3\_D}$ to avoid the overlap with packets of a different flow, e.g. second flow 62 from a different baseband hotel.

In some examples, the downlink predetermined delay is determined independently of the uplink predetermined delay for a particular flow. This independent determination allows avoiding a collision with packets of other flows, and/or maintaining a total latency between RRU and DU that is less than a maximum value. The independent determination provides for the network node delaying a packet of the same flow by a different predetermined delay in uplink and downlink.

In some examples, the predetermined delay at a node for a particular data flow is the same in uplink and downlink. In other examples, the predetermined delay is different in uplink and downlink. In some examples, a control plane or network management system (NMS) is configured to control the delay in each direction. The control plane or NMS may configure one or more further nodes to compensate for the difference in delay in uplink and downlink for a flow, such that the time for a data flow is symmetrical in uplink and downlink between a RRU and a DU. In some examples, an end node provides the timing compensation.

In some aspects, the network node 15 is configured to delay packets of a first flow by a different amount of time in uplink and in downlink.

FIG. 14 shows a further example of scheduling 140. The scheduling 140 comprises multiple first periods 142a,142b for CPRI traffic within a cycle 141a. A further cycle 141b is shown with the same allocation of a plurality of first periods 142a,142b for CPRI traffic. Each cycle further has a second time period 144 allocated for other (non-CPRI) traffic. In this example, each cycle includes a single such second time period 144.

Each cycle 141a,141b further comprises one or more guard periods 146a,146b. In some aspects, as described above, no packets are started in transmission in a guard period. In this example, two guard periods are in each cycle. Each guard period directly precedes a first period 142a,142b allocated to CPRI traffic. For example, a first guard period 146a precedes the first period 142a, and directly follows the second period 144 for other traffic, in this case of the earlier cycle 141a. The guard period directly precedes a said first period in a plurality of transmitted scheduling cycles.

The second guard period 146b is directly prior to the first period 142b. The second guard period 146b directly follows first period 142a. In some aspects, each first period 142a, 142b for CPRI traffic is directly preceded by a guard period. In some aspects, multiple guard periods are interlaced with CPRI traffic. Different orderings of the periods, and higher numbers of first periods, guard periods and/or second periods may be scheduled in a cycle.

Thus, the scheduling cycle comprises a plurality of first periods in which data packets between a Remote Radio Unit and a Digital Unit are transmitted from the output port, wherein the plurality of first periods are separated by a guard period and/or a said second period.

FIG. 15 shows a method 150 of operation of a network node 15 in packet network 10. The network node 15 is configured to carry out the method 150 in order to avoid collisions between data flow packets (between a RRU and a DU, e.g. using CPRI) and further packets (not between a RRU and a DU, e.g. not using CPRI).

In 152, the network node receives one or more data flow packet and/or one or more further packet.

In 154, the network node identifies whether the received packet is a data flow packet or a further packet.

In 156, the network node allocates the packet to a specific time period of a transmission scheduling cycle.

In 158, the packet is stored in a buffer until the allocated time period. In some aspects, the network node allocates a transmission time to a packet within the time period, in order to additionally avoid contention between packets of the same type (i.e. data flow packet or further packet).

In 159, the packet is transmitted within the allocated time period for that type of packet. This ensures that packets which require low latency, i.e. data flow packets, can be transmitted with a relatively small delay. As described above, the packet may intentionally be stored for a predetermined delay period to ensure that time symmetry in communication is maintained between uplink and downlink.

FIG. 16 shows a method 160 of operation of a network node 15 in packet network 10. The network node 15 is configured to carry out the method 160 in order to avoid collisions between a plurality of data flow packets (between a RRU and a DU, e.g. using CPRI).

In 162, the network node receives a plurality of data flow packets.

In 164, the network node identifies whether flow associated with the data flow packet.

In 166, the network node determines a delay to be added to the data flow packets prior to transmission from the output port of node. In some examples, the delay is determined from information already stored in the node, for example, from a previous calculation or from information received, e.g. from a network management system. In some examples, the delay is determined by calculating within the node an amount of time to delay one or more packets to avoid the collision at the output port. A particular flow has the same delay applied by each network node. In some aspects, each flow may be considered as having a constant bit rate. Aspects of the disclosure provide for packets with a controlled latency and (ideally) zero packet delay variation.

In 168, the packet is stored in a buffer until the allocated time period. The network node allocates a transmission time to a packet within the time period in which data flow packets are transmitted.

In 170, the packet is transmitted at the allocated time. This ensures that packets do not collide. As described above, the packet may intentionally be stored for a predetermined delay period to ensure that time symmetry in communication is maintained between uplink and downlink.

In some aspects, the multiple first periods of CPRI traffic provide a solution to the contention constraints described above for all flows. This allows collisions to be avoided, with an acceptable delay to the packets, and so meet the CPRI requirements.

In some aspects, RRUs 2 might not always be fully synchronized, but in may be very close in frequency (e.g.

due to high wander or, in examples where the RRUs are locked to independent DUs. In this case, a frequency offset might be present. In such cases, generating constant bit rate (CBR) traffic and eventually periodic packets, may result in a beating effect. This may be controlled by modifying the fixed latency for a specific flow if needed. For example, assuming a 5 ns interval is allocated between the CPRI packets, with 10-11 frequency difference (all CPRI links are in fact synchronous with the DU) the fixed delay (latency parameter) L for a specific flow would need to be updated every 50 seconds. In some examples, this could be done with small steps (e.g. every few seconds) so as to not disturb the CPRI operations or increasing the distance between CPRI flows.

Aspects provide for transport of traffic between RRUs and DUs (e.g. in accordance with CPRI) over a packet switched network. This allows a commonly available packet transport network to be used.

Aspects provide for effective transmission of data flows which meet the specific requirements of flows between a RRU and DU, e.g. asymmetry is controlled or avoided, conflicts among data flows and non-data flow traffic are avoided, and/or conflicts among data flows which compete on an output port are avoided. These aspects are achieved without requiring complete network synchronization at an extremely tight level.

An aspect of the disclosure comprises a computer program product, configured when run on a processing arrangement, to carry out any feature or method described. The processing arrangement may be in the network node 15 or in a separate NMS or controller. In some examples, the processing arrangement is at least partially embodied by the scheduler 31. In some examples, a memory is associated with the processing arrangement and/or network node, for storing data and/or programs to implement any aspect of the disclosure.

In some aspects, the network node, system or method may be directed any feature or example described, separately to any other feature. For example, the network node, system or method may be defined according to the network node being configured to transmit a said data packet from the output port at a predetermined time after receiving said data packet at the input port. Alternatively, each data packet is associated with a flow between a Remote Radio Unit and a Digital Unit. Data packets associated with a first flow are transmitted after a first predetermined delay from the network node. Data packets associated with a second flow are transmitted after a second predetermined delay from the network node. The first predetermined delay is different to the second predetermined delay. Alternatively, the network node is configured to delay packets of a first flow by a different amount of time in uplink and in downlink.

The network node may alternatively be considered as a network element, a switch, a router or a network device.

References to a DU may be considered to alternatively refer to Radio Equipment Control, and the RRU may be considered to alternatively refer to Radio Equipment.

The invention claimed is:

1. A network node configured to switch data packets between a Remote Radio Unit and a Digital Unit, the network node comprising:
    one or more input ports configured to receive said data packets and receive further packets having a destination other than one of a Remote Radio Unit and a Digital Unit, wherein each data packet is associated with a flow between the Remote Radio Unit and the Digital Unit;
    one or more output ports configured to transmit said data packets and said further packets; and
    a scheduler circuit configured to control transmission from the output port according to a scheduling cycle; and
    wherein the scheduler circuit is configured to schedule only said data packets to be transmitted in a first period of the scheduling cycle, and schedule one or more of said further packets to be transmitted in a separate second period of the scheduling cycle,
    wherein the network node delays packets of a first flow by a same or different amount of time in uplink and downlink, wherein data packets associated with the first flow are transmitted after a first predetermined delay from the network node and data packets associated with a second flow are transmitted after a second predetermined delay from the network node, the first predetermined delay being different to the second predetermined delay, the first and/or the second predetermined delay being controlled by the network node such that for said data packet of the first flow which arrives prior to, and at least partially overlapping in time with said data packet of the second flow, the first predetermined delay is less than the second predetermined delay.

2. The network node of claim 1, wherein the data packets between a Remote Radio Unit and a Digital Unit are Common Public Radio Interface (CPRI) packets.

3. The network node of claim 1, wherein the scheduling cycle comprises a guard period, wherein the guard period directly precedes said first period in a plurality of transmitted scheduling cycles.

4. The network node of claim 1, wherein the scheduling cycle comprises a plurality of first periods in which data packets between a Remote Radio Unit and a Digital Unit are transmitted from the output port, wherein the plurality of first periods are separated by a guard period and/or said second period.

5. The network node of claim 1, wherein the network node is configured to transmit said data packet from the output port at a predetermined time after receiving said data packet at the input port.

6. The network node of claim 1, wherein the network node comprises:
    a counter configured to register an arrival time at the input port of said data packet,
    an internal clock,
    wherein the network node is configured to transmit said data packet from the output port at a predetermined time after the registered arrival time, based on the timing provided by the internal clock.

7. A packet network comprising a plurality of network nodes of claim 1.

8. A system comprising:
    a plurality of Remote Radio Units,
    one or more Digital units, and
    the packet network of claim 6 configured to connect said Remote Radio Unit and a Digital unit.

9. A method of switching data packets between a Remote Radio Unit and a Digital Unit, the method comprising:
    receiving said data packets and receiving further packets having a destination other than one of a Remote Radio Unit and a Digital Unit, wherein each data packet is associated with a flow between the Remote Radio Unit and the Digital Unit;
    identifying said data packets and said further packets;
    allocating said data packets and said further packets to a scheduling cycle; and transmitting only said data packets in a first period of the scheduling cycle, and transmitting one or more of said further packets in a separate second period of the scheduling cycle, wherein the method further comprising:

delaying packets of a first flow by a same amount of time in uplink and in downlink, or a different amount of time in uplink and in downlink, wherein data packets associated with the first flow are transmitted after a first predetermined delay from the network node and data packets associated with a second flow are transmitted after a second predetermined delay from the network node, the first predetermined delay being different to the second predetermined delay, the first and/or the second predetermined delay being controlled by the network node such that for said data packet of the first flow which arrives prior to, and at least partially overlapping in time with said data packet of the second flow, the first predetermined delay is less than the second predetermined delay.

10. The method of claim 9, wherein the scheduling cycle comprises a guard period, wherein the guard period directly precedes a said first period in a plurality of transmitted scheduling cycles.

11. The method of claim 9, comprising: transmitting a said data packet at a predetermined time after receiving said data packet.

12. A non-transitory, computer-readable medium comprising, stored thereupon, a computer program instructions configured so as to cause, when run on a computer, the computer to carry out a method according to claim 9.

* * * * *